United States Patent [19]

Kapp et al.

[11] Patent Number: 5,223,677
[45] Date of Patent: Jun. 29, 1993

[54] HANDWRITING CAPTURE DEVICE WITH INSERTABLE FORM INTERFACE

[75] Inventors: Michael A. Kapp, New Philadelphia; Albert M. Onega, Lore City, both of Ohio

[73] Assignee: NCR Corporation, Dayton, Ohio

[21] Appl. No.: 756,943

[22] Filed: Sep. 9, 1991

[51] Int. Cl.$^5$ ............................................. G08C 21/00
[52] U.S. Cl. ....................................... 178/18; 340/706
[58] Field of Search ........................... 178/18, 19, 20; 340/712, 706; 382/3, 13

[56] References Cited

U.S. PATENT DOCUMENTS

| | | | |
|---|---|---|---|
| 4,679,241 | 7/1987 | Lukis | 382/13 |
| 4,853,493 | 8/1989 | Schlosser et al. | 178/18 |
| 5,049,862 | 9/1991 | Dao et al. | 340/706 |
| 5,115,107 | 5/1992 | Crooks et al. | 178/18 |

*Primary Examiner*—Stafford Schreyer
*Attorney, Agent, or Firm*—Paul W. Martin

[57] ABSTRACT

A handwriting capture device which employs an insertable form interface over a digitizer to minimize or eliminate the need for a display. The form may include a menu corresponding to a repetitive task, a keypad, or a place for a signature. The form may be removable as a receipt, work order, invoice, or other document. The handwriting capture device also includes a housing having a top surface and a recess within the top surface, a frame for holding the form in the recess in the top surface, and circuitry for processing information entered into the digitizer. A display of minimal size may be added when the form is permanent and reusable to display signature and user prompts.

3 Claims, 5 Drawing Sheets

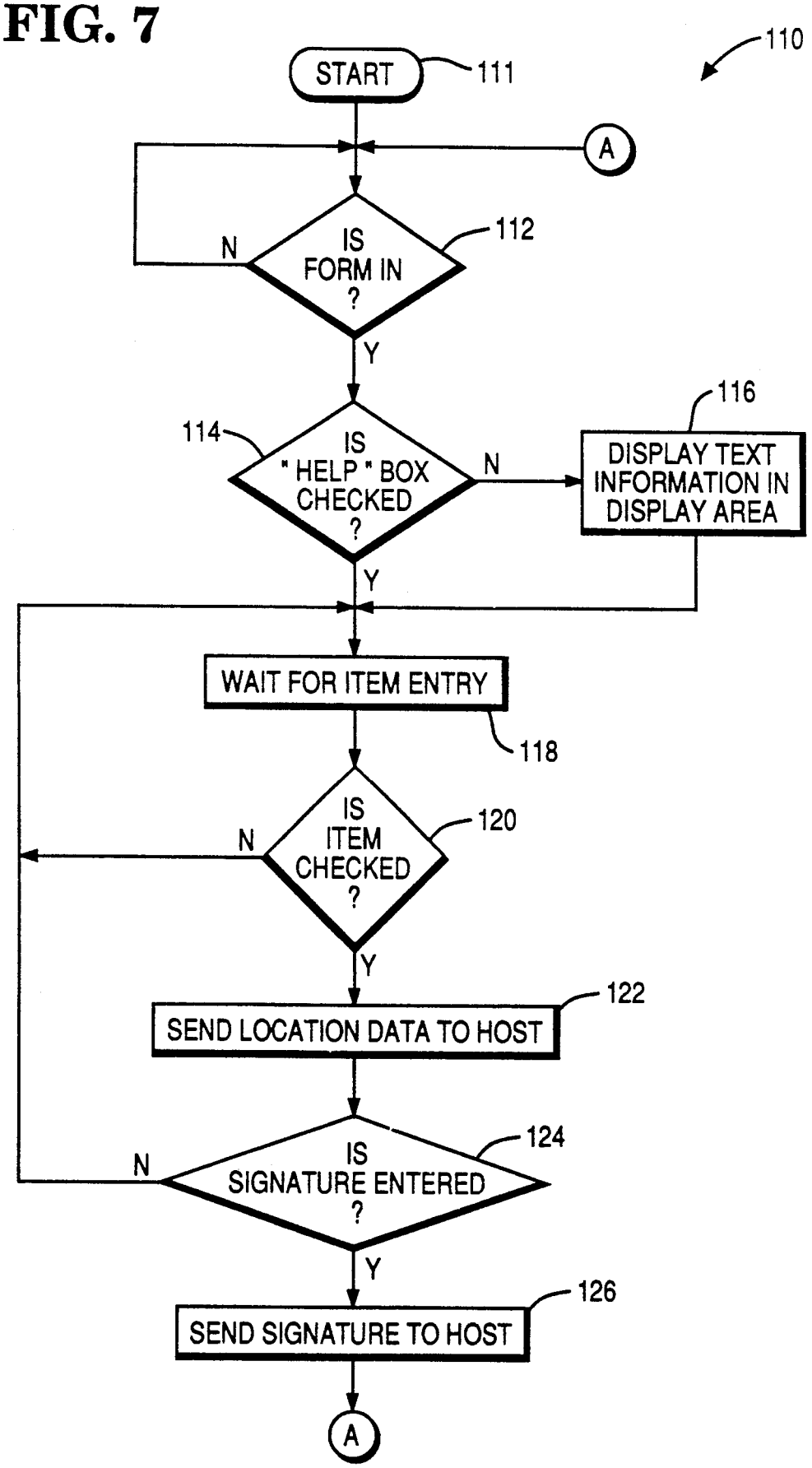

HANDWRITING CAPTURE DEVICE WITH INSERTABLE FORM INTERFACE

CROSS REFERENCE TO RELATED APPLICATIONS

The present invention is related to commonly assigned and co-pending U.S. applications entitled, "Write Input Transaction Apparatus and Method", filed Aug. 30, 1990, invented by Allgeier et. al., and having a application Ser. No. 07/575,096, and "Handwriting Capture Device", filed May 17, 1991, invented by Protheroe et. al., and having a serial number 07/703,430, U.S. Pat. No. 5,120,906.

BACKGROUND OF THE INVENTION

The present invention relates to signature capture devices and more specifically to a handwriting capture device with an insertable form interface.

Today, retailers and service providers are burdened with having to store and retrieve large amounts of paper records from credit and check transactions. Normally, these records are produced at a retail terminal or personal computer as master copies of sales receipts, invoices, and work orders. During a transaction, both a clerk and a customer enter information onto such documents in order to complete a transaction.

Allgeier et. al. disclose a write input device employing a display underneath a transparent digitizer to capture signature information. The display gives a customer feedback for stylus input.

Protheroe et. al. disclose a write input device employing a pressure-sensitive digitizer without a display.

Liquid crystal displays make write input devices expensive. Therefore, it would be desirable to minimize the number of items requiring display and, therefore, the size of the display. It would also be desirable to eliminate the need for multiple transaction documentation and multiple-person entry of information onto documents.

SUMMARY OF THE INVENTION

In accordance with the teachings of the present invention, a handwriting capture device with an insertable form interface is provided. The form may include a menu corresponding to a repetitive task, a keypad, or a place for a signature. The form may be removable as a receipt, work order, invoice, or other document. The handwriting capture device also includes a housing having a top surface and a recess within the top surface for containing the form, a frame for holding the form in the recess in the top surface, and circuitry for processing information entered into the digitizer. A display of minimal size may be added when the form is permanent and reusable to display signature and user prompts.

It is accordingly an object of the present invention to provide a handwriting capture device with an insertable form interface.

It is another object of the present invention to provide a handwriting capture device, which is less expensive than a handwriting capture device employing a full-size liquid crystal display mounted beneath a transparent digitizer.

It is another object of the present invention to provide a handwriting capture device which employs an insertable form interface and which does not require a display or requires a display of reduced size which is only large enough to display information requiring operator feedback.

It is another object of the present invention to provide a handwriting capture device which employs a frame for holding the insertable form interface in place over the digitizer.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 7 is a second flow diagram of the application program within the handwriting capture device of the present invention.

DETAILED DESCRIPTION OF THE PREFERRED EMBODIMENT

Figure 1:
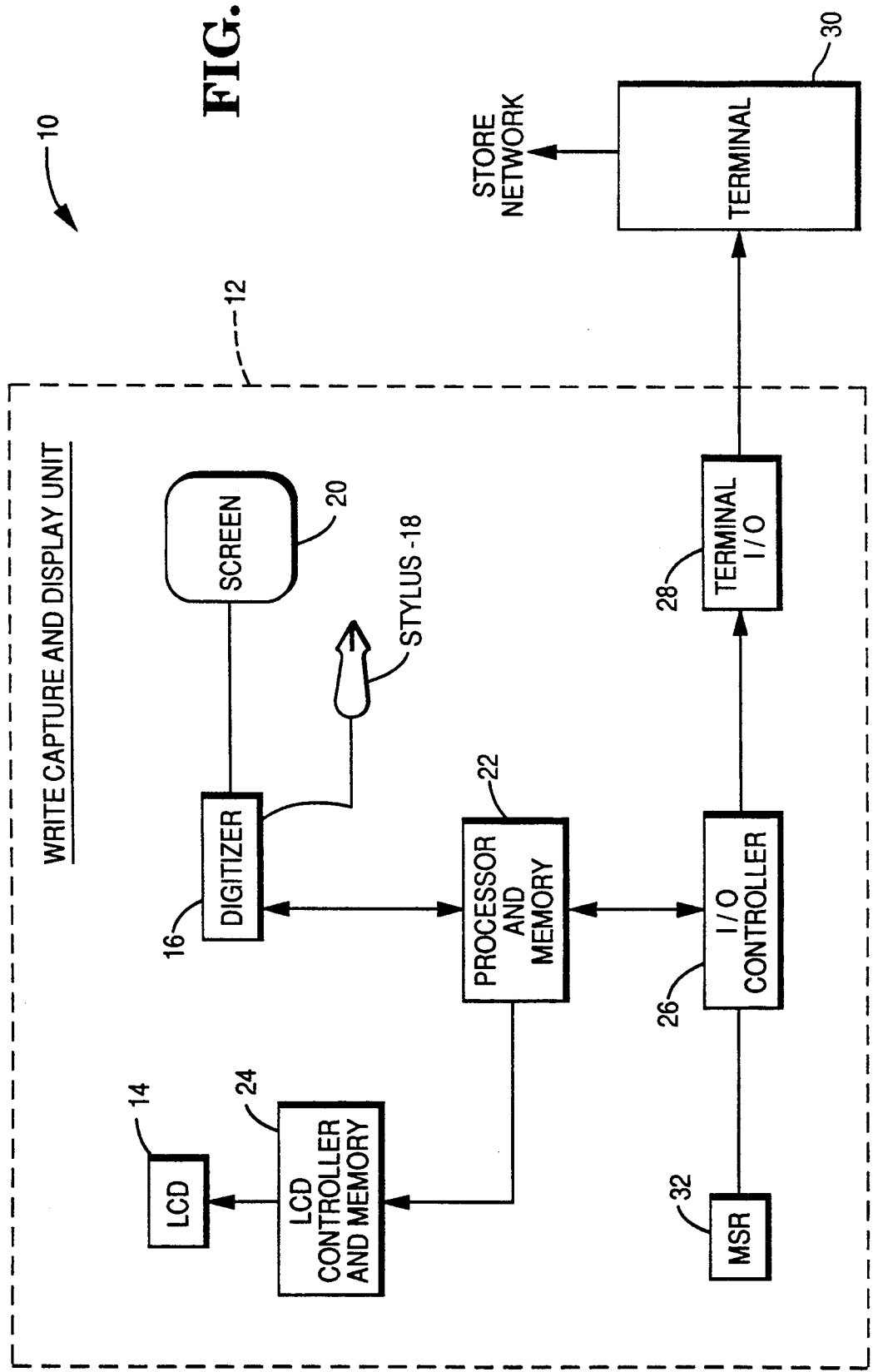
FIG. 1 is a block diagram of the handwriting capture device of the present invention.

Turning now to FIG. 1, a typical point of service (POS) system 10, including handwriting capture device 12 of the present invention, is shown. Handwriting capture device 12 can be any system that captures signatures electronically, such as the one disclosed in co-pending application Ser. No. 07/575,096, entitled, "Write Input Transaction Apparatus and method".

A system employing a pressure pad digitizer without a display may also be used, such as the one found in co-pending application Ser. No. 07/703,430, U.S. Pat. No. 5,120,906 entitled, "Handwriting Capture Device". In such a case, an ordinary pen may be used as a writing instrument.

Handwriting capture device 12 is shown in block form in phantom lines and employs commercially available components, including optional liquid crystal display (LCD) module 14 and transparent digitizer 16 with associated stylus 18 and transparent screen 20, through which a representation of a receipt may be seen and upon which information may be entered by writing thereon with stylus 18.

Handwriting capture device additionally includes control and processing circuitry, including processor and memory 22, LCD controller and memory 24, input/output (I/O) controller 26, and terminal input/output (I/O) 28.

LCD controller and memory 24 couples to LCD 14 and controls the display of messages from processor and memory 22.

Terminal I/O 28 is an input/output interface, typically an RS 232 interface, for message traffic to and from handwriting capture device 12.

I/O controller 26 couples to terminal I/O 28 and routes message traffic to and from processor and memory 22.

Handwriting capture device 12 may also include encryption circuitry and printer input/output circuitry for a stand alone printer.

Processor and memory 22 couples to I/O controller 26 and classifies and processes message traffic. Message traffic may include four types of control messages, including "Display Information", Accept Information", "Transmit Information", and "Update Information".

Display Information messages are sent to LCD controller 24 to display either information contained in the message or information resident in memory 24.

Accept information messages activate logic within processor and memory 22 which senses stylus activation and handwriting data from digitizer 16. Handwriting data is captured and echoed to LCD 14 through processor and memory 22 so as to provide a display of the writing to the writer in real time.

A Transmit Information message causes processor and memory 22 to send the handwriting data to terminal 30. Transmit Information messages are also used for requesting diagnostic information from handwriting capture device 12.

An Update Information message causes program loading and stored display information to be sent to handwriting capture device 12.

The system 10 may also include a magnetic stripe reader (MSR) 32, as part of handwriting capture device 12, as part of terminal 30, or as a separate unit. Here, magnetic stripe reader 32 is shown as part of handwriting capture device 12.

System 10 additionally includes a host unit, which, preferably, is a point of service (POS) terminal 30. It can be any suitable device of that type, such as a class 7052 terminal with monochrome monitor, marketed by NCR Corporation, Dayton, Ohio. Terminal 30 may include a printer and a disk drive.

Figure 2:
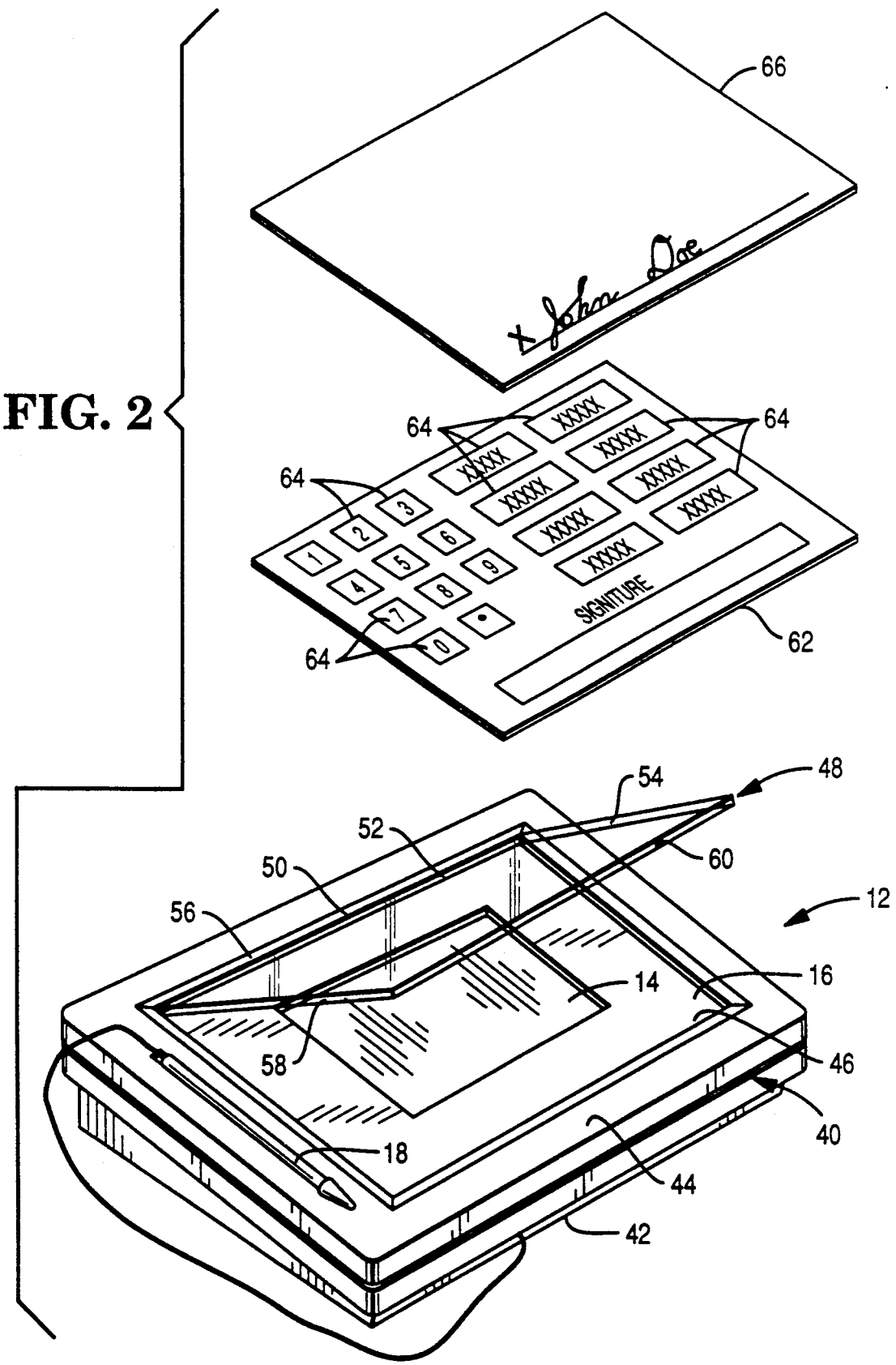
FIG. 2 is a perspective view of the handwriting capture device and form interface of the present invention.

Referring now to FIG. 2, handwriting capture device 12 of the present invention is shown. Handwriting capture device 12 includes housing 40 having bottom supporting surface 42 and top surface 44. In this embodiment, housing 40 is generally rectangular in shape. Handwriting capture device 12 is lightweight and portable. The ends of housing 40 are sufficient in width and depth to facilitate grasping of housing 40.

Just below top surface 44 within recess 46 are digitizer 16 and LCD 14. In the preferred embodiment, LCD 14 is smaller than digitizer 16.

Recess 46 receives frame 48 of similar outside dimension which in the preferred embodiment is mounted adjacent rear edge 50 of recess 46 using hinge 52. Frame 48 includes four side members 54-60. Frame 48 fits snugly when seated within recess 46.

Insertable form 62 fits within recess 46 and is held in place by frame 48. Insertable form 62 includes indicia 64 describing functions which may be customized to meet the needs of any business in which handwriting capture device 12 is used. The location of each function is correlated with a coordinate location on digitizer 16. Insertable form 62 may include a hole for a signature to be entered and displayed. If no signature hole is present, form 62 may be used as a receipt or a separate receipt 66 may also be placed over form 62 such that the signature line on form 62 is in line with the signature line on receipt 66. Receipt 66 may be held in place during signature entry by frame 48.

Figure 3:
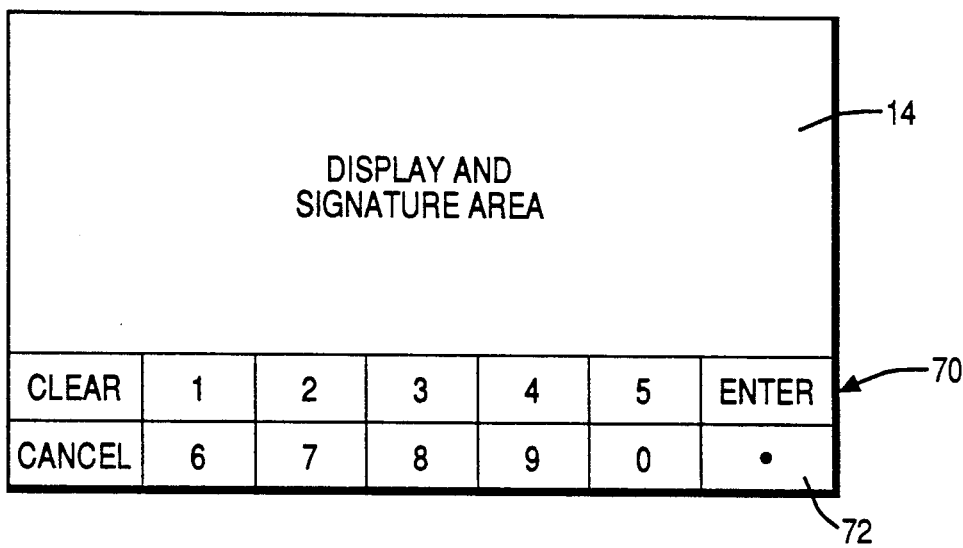
FIG. 3 is a first example of an insertable form of the present invention.

Referring now to FIG. 3, a permanent type of insertable form 70 is shown. Form 70 includes keypad 72, complete with clear, cancel, enter, and decimal functions. Keypad 72 enables an operator to input information into the digitizer through form 70. Keypad 72 covers the lower portion of top surface 44 where no part of LCD 14 is located. Thus, form 70 substitutes numeric entry for visual feedback from a display and results in a significant reduction in the size of LCD 14.

LCD 14 is used to provide virtually instantaneous feedback for signature information entered into digitizer 16. When the transaction has proceeded to the point where customer debit/credit authorization is required, receipt 66 and account information are displayed and oriented towards the customer. The customer is then prompted for his signature.

Figure 4:
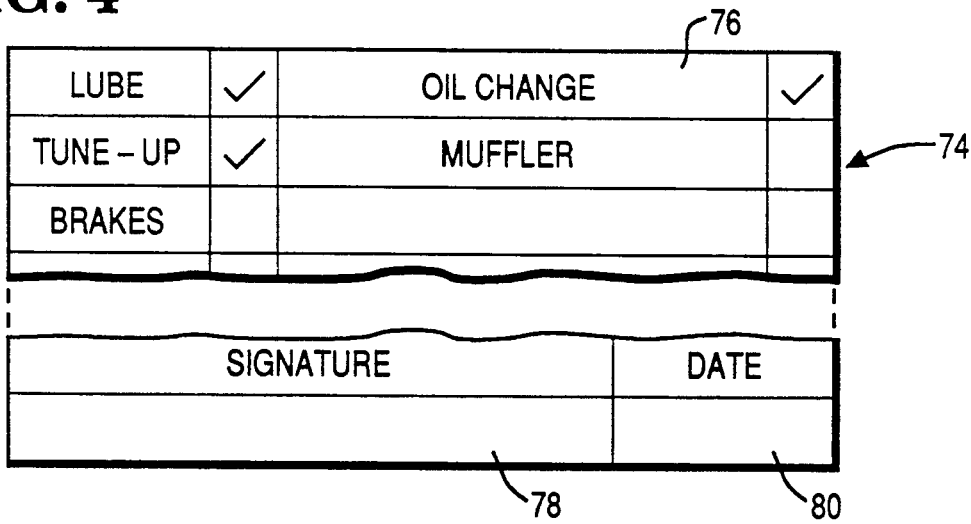
FIG. 4 is a second example of an insertable form of the present invention.

Referring now to FIG. 4, a second type of insertable form 74 is shown. Form 74 is a removable form which includes menu 76 of maintenance items and signature and date boxes 78 and 80. Advantageously, maintenance items can be directly chosen by a customer. After the customer enters his signature, form 74 may be removed and used as a work order or a customer receipt.

Advantageously, form 74 requires no display. Visual feedback to the user is provided by the indicia and the pressure required to make a legible impression on form 74. However, it does require a pressure-sensitive digitizer so that a normal writing device, such as a pen or pencil can be used to provide input.

Figure 5:
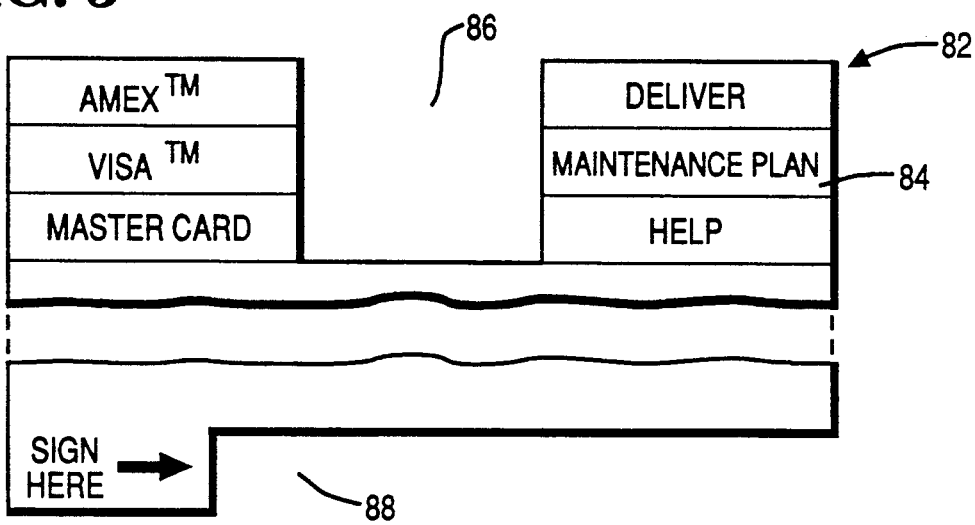
FIG. 5 is a third example of an insertable form of the present invention.

Referring now to FIG. 5, a third type of form 82 is shown. Form 82 is a reusable form which includes menu 84 and cutout areas 86 and 88 disposed over LCD 14. Advantageously, cutout areas 86 and 88 require only a limited display area for customer-specific information, such as transaction choices and signature.

Form 82 provides visual lead through to the user for input prompting. Menu selections prompt application logic instead of keyboard entries o terminal 30.

Figure 6:
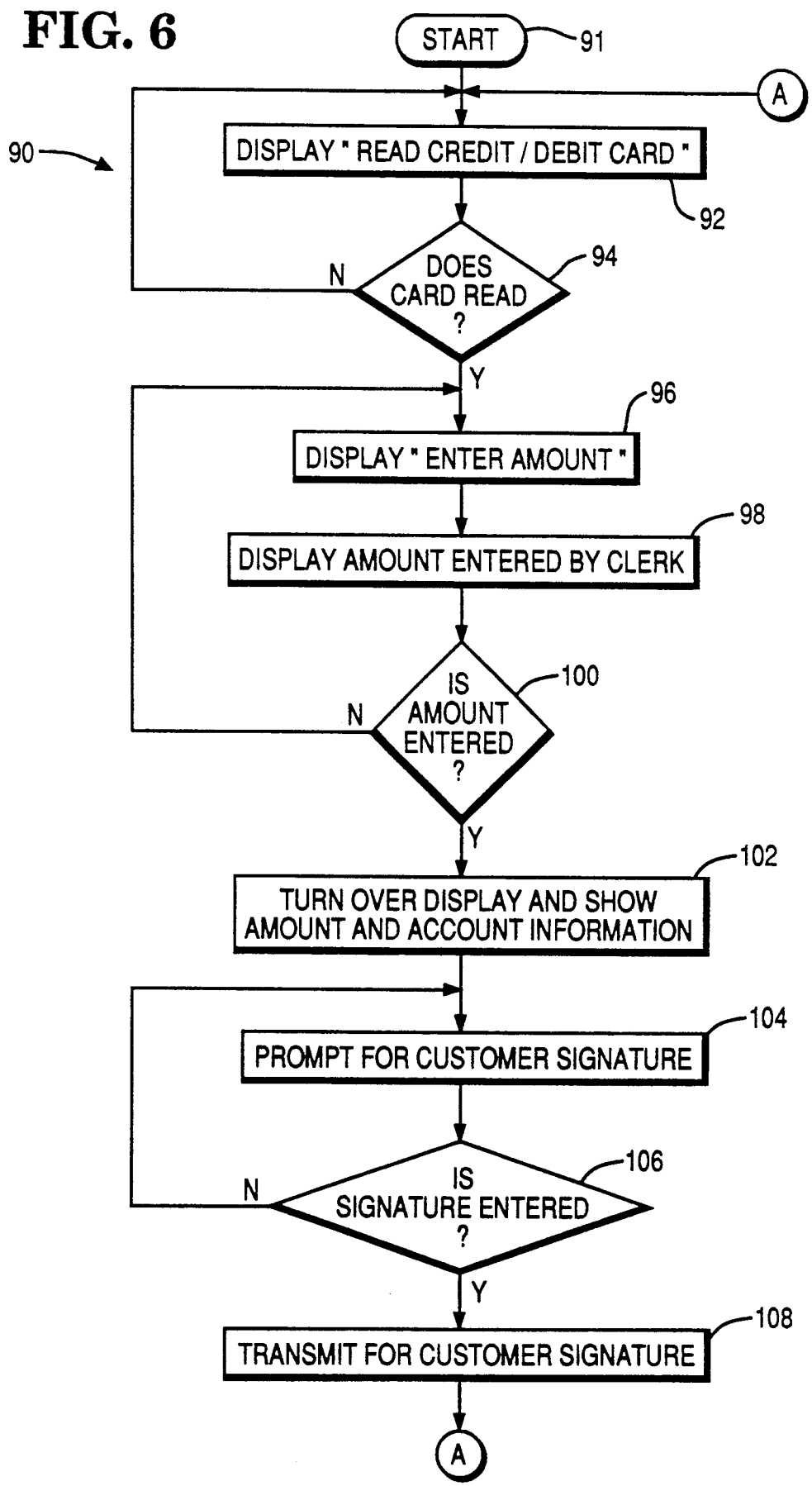
FIG. 6 is a flow diagram of the application program within the handwriting capture device of the present invention.

Referring now to FIG. 6, application program 90 for insertable form 70 is shown. From start condition 91, program 90 begins in block 92 by sending a message to LCD 14 to illuminate LCD 14 with a user prompt message, "READ CREDIT/DEBIT CARD".

In block 94, handwriting capture device 12 remains at this prompt until the credit/debit card information has been entered, either through magnetic strip reader 32, the keyboard of terminal 30, or the keypad of form 70. Account information appears on LCD 14 as it is entered.

After credit/debit card information has been entered, in block 96 program 90 sends a message to LCD 14 to display user prompt message, "ENTER AMOUNT". The user then enters the amount through keypad 72.

In block 98, the amount is displayed on LCD 14 as it is being entered.

In block 100, amount entry is complete when the "Enter" key is touched with stylus 18.

Upon entry of amount information, in block 102 the account number and transaction amount are turned over on LCD 14 for the customer to see, thereby obviating the need for rotating device 12.

In block 104, program 90 sends a message to LCD 14 to display user message prompt, "ENTER SIGNATURE".

In block 106, signature entry is complete when a predetermined period of time has elapsed or when an operator-induced command is entered.

In block 108, handwriting capture device 12 formats a signature message and sends it to a host unit, which in this embodiment is terminal 30, for data capture of the transaction. Program 90 then returns to block 92 to await another transaction.

Referring now to FIG. 7, program 110 for insertable forms 74 and 82 is shown. From "START" block 111, program 110 proceeds to block 112. In block 112, program 110 checks for the indication that a form is inserted in recess 46. This indication is provided to program 110 by an operator-induced message from terminal 30, although automatic presence-sensing devices are also envisioned.

Program 110 waits for user input. In block 114, if the "HELP" box is checked, then appropriate text information is displayed in cutout area 86, as represented in block 116. Otherwise, in block 118, program 110 waits for item entry.

In block 120, program 110 waits for menu items to be checked. If the items have not been entered, then program 110 returns to block 118.

For each selection, the location on digitizer 16 is sent to terminal 30 in block 122 so that customer selections can be correlated with their respective menu items.

In block 124, program 110 checks for signature entry. If the signature has not been entered, program 110 branches back to block 118.

If the signature has been entered, program 110 sends the signature information to terminal 30 in block 126 and returns to block 112 to await insertion of another form.

Advantageously, the apparatus and method of the present invention eliminate the need for multiple transaction documentation as transaction information is stored electronically while a user or customer generates a receipt in the process. Furthermore, multiple-person entry of information onto documents is unnecessary as the insertable form interface allows a single user or customer to complete an order by himself. If a display is included, user prompts and user requested "HELP" are available, thereby minimizing the need for clerks and receptionists.

Although the invention has been described with particular reference to certain preferred embodiments thereof, variations and modifications of the present invention can be effected within the spirit and scope of the following claims.

What is claimed is:

1. A handwriting capture device comprising:
   a housing having a top surface and a recess within the top surface;
   a digitizer, mounted within the top surface, being sensitive to a predetermined minimum writing force from an ordinary writing instrument;
   a display within the top surface for displaying only signature information entered into the digitizer;
   a form adjacent to the digitizer for describing a transaction, the digitizer underlying substantially all of the form, the form requiring a signature and having a menu having a plurality of keys which are activatable by touching them, wherein the form has edges which describe a cutout area exposing the display and minimizing the size of the display, the display being only as large a the cutout area;
   retaining means for holding the form in a predetermined position on the top surface including a frame rotatably hinged at one side of the top surface to allow removal and replacement of the form; and
   circuit means coupled to the digitizer and mounted within the housing for processing signature information and information entered through the menu;
   wherein the interface means is usable in a plurality of transactions.

2. A method for capturing handwriting associated with a repetitive task comprising the steps of:
   placing a form corresponding to the repetitive task on a writing surface, the writing surface including a digitizer and a display, the digitizer underlying substantially all of the form, the form including a menu usable in a plurality of transactions and edges which describe a cutout area exposing the display and a portion of the digitizer, the display occupying only the cutout area, wherein the step of placing includes the substep of lifting a frame rotatably mounted on one side of the writing surface for holding the form in place;
   applying a writing to the digitizer by checking off predetermined menu items on the menu and by applying a signature to the exposed portion of the digitizer;
   processing a signal representing the menu information and the signature information from the digitizer; and
   displaying the signature through the cutout area as the signature is applied.

3. A handwriting capture system comprising:
   a handwriting capture device, including:
      a housing having a top surface and a recess within the top surface;
      a digitizer, mounted within the top surface, being sensitive to a predetermined minimum writing force from an ordinary writing instrument;
      a display within the top surface for displaying only signature information entered into the digitizer;
      interface means adjacent to the digitizer for describing a transaction including a form requiring a signature and having a menu having a plurality of keys which are activtable by touching them, wherein the form has edges which describe a cutout area exposing the display and minimizing the size of the display;
      retaining means for holding the interface means in a predetermined position on the top surface including a frame rotatably hinged at one side of the top surface to allow removal and replacement of the interface means; and
      circuit means coupled to the digitizer and mounted within the housing for processing signature information and information entered through the menu;
      wherein the interface means is usable in a plurality of transactions; and
   a point-of-service terminal coupled to the handwriting capture device for processing the menu and signature information and for verifying the signature information.

* * * * *